Oct. 6, 1964  MASARU YAMANO ET AL  3,152,271

DYNAMO-ELECTRIC MACHINES

Filed May 8, 1962

३,१५२,२७१
DYNAMO-ELECTRIC MACHINES
Masaru Yamano, Hirakata-shi, and Toshio Iemura, Oaza Kawaguchi, Yawatacho, Tsuzuki-gun, Kyoto, Japan, assignors to Sanyo Electric Co., Ltd., Moriguchi-shi, Japan, a corporation of Japan
Filed May 8, 1962, Ser. No. 193,247
Claims priority, application Japan Dec. 13, 1961
1 Claim. (Cl. 310—53)

This invention relates to dynamo-electric machines, and more particularly to those comprising rotor members forming field elements of ferrite permanent magnets.

Permanent magnet of ferrite is known which has particularly high coercive force in comparison to ordinary metal magnets, and is extremely stable magnetically so that it highly retains its magnetic strength against internal and external demagnetizing forces as well as against mechanical shocks. Consequently, ferrite permanent magnets are most suitable for field elements of magnetogenerators for vehicle use and the like.

However, permanent magnets of ferrite have negative temperature coefficient of permanent magnetic flux density of $-0.2\%/°$ C. Therefore, if dynamo-electric machines comprise ferrite rotors as field elements, any temperature rise due to copper loss, iron loss, ambient temperature, and other internal and external reasons would result in lowering of the field strength, and the machine outputs would be lowered.

Accordingly, the primary object of the present invention is to provide dynamo-electric machines comprising ferrite permanent magnets as field rotors having means for effectively and controllably preventing temperature rise of the rotors.

Another object of the present invention is to provide effective and controllable means for preventing temperature rise of ferrite rotors by utilization of the known Peltier effect.

There are other objects and particularities of the present invention which will be made obvious from the following detailed description of an embodiment of the invention with reference to the accompanying drawings; in which—

Figure 1:
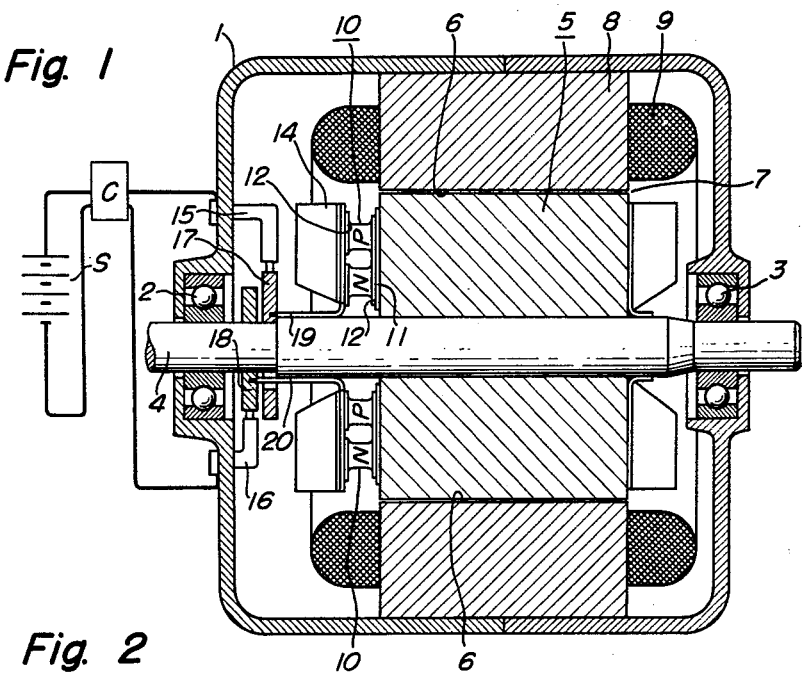
FIG. 1 is a longitudinally sectional and somewhat diagrammatic view of a magnetogenerator embodying the present invention.

Referring to FIG. 1, a generally cylindrical casing 1 carries at opposite ends ball bearing devices 2 and 3 which support a rotatable shaft 4 to be driven from a vehicle shaft, not shown. The shaft 4 carries a cylindrical rotor 5 formed of ferrite and rigidly mounted thereon. The ferrite rotor 5 has a cylindrical surface 6 having alternate N and S permanent magnet poles formed and distributed therearound, as usual, and constitutes the field element of a magneto generator whose armature element comprises a stator core 8 of magnetic material rigidly mounted inside the casing 1 and an armature winding 9 associated with the core 8, both disposed around the rotor 5 leaving a usual annular air gap 7 therebetween and all around the magnetized surface 6 of the rotor.

Figure 2:
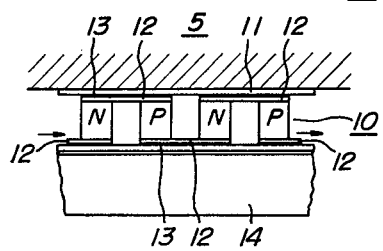
FIG. 2 is a developed view of a portion of the rotor showing detailed construction of a thermo-electric unit comprising the cooling element.

On an end face of the cylindrical ferrite rotor 5, a plurality of thermo-electric cooling units 10 are rigidly mounted. Referring to FIG. 2, each thermo-electric cooling unit 10 comprises a heat-conductive plate 11, such as of aluminum, heat-conductively secured to the end face of the rotor 5, and a plurality of Peltier thermo-electric elements having P-N junction planes formed by aluminum or copper plates 12 secured to the plate 11 by means of highly heat-conductive and electrically insulating adhesive agent 13.

As is well-known as Peltier effect, when two conductors of differenet metals are jointed together in end-to-end relation and a direct electric current is pased therethrough, heat absorption or heat generation is observed at the junction plane of the two metals depending upon the direction of current flow. If heat is absorbed at the junction plane when current flows in one direction, heat is generated at the same junction plane when current flows in the opposite direction. In either case, at the free end of each conductor opposite to the junction plane, thermal effect is reversed. Thus, if heat is absorbed at the junction plane, heat is generated at the free end. Semi-conductors of alloys consisting of bismuth, tellurium, antimony, selenium, etc. are known to exhibit Peltier effect most remarkably. The alloy is classified as P-type or N-type depending upon the proportion of mixture of the elements enumerated and of particular additive impurities. The junction plane of P-type semi-conductor and N-type semi-conductor is called "P-N junction plane." When current flows in the direction from N-type to P-type conductors, heat is absorbed at the P-N junction plane, while heat is generated at the opposite ends of the conductors. On the contrary, when current flows from P-type to N-type conductors, heat is generated at the junction plane, while heat is absorbed at the opposite ends of the conductors.

Referring back to FIG. 2, a plurality of blocks of N-type and P-type semi-conductors are shown by letters N and P, respectively, and are jointed together through aluminum or copper plates 12 secured thereto forming P-N junction planes. The inner P-N junction plates 12 are heat-conductively associated with the adjacent end face of the ferrite rotor 5 as afore-mentioned. The outer P-N junction plates 12 carry heat-radiating fins or wings 14. The base plates of heat-radiating wings 14 are secured to the heat-generating P-N junction plates by means of heat-conductive and electrically insulating adhesive agent 13. When direct electric current is passed through the thermoelectric cooling unit 10 in the direction shown by the arrows, heat is absorbed from rotor 5 at the adjacent P-N junction planes, while heat is generated at the opposite or outer P-N junction planes, in effect, conducting heat from the rotor 5 to the heat-radiating wings 14 which may be disposed at such zone within the casing 1 where the wings 14 are subjected to the most effective cooling effect of air. In addition, the heat-absorbing effect of the inner P-N junction planes can be regulated by adjusting the value of direct current flowing through the thermoelectric cooling units 10, that is, through the P-type and N-type semi-conductors in series, and consequently, the temperature of the ferrite rotor 5 can be kept substantially constant in spite of changes in the ambient temperature or heat generation in the magnetogenerator. This signifies that the rated output of the generator is maintained permanently.

Figure 3:
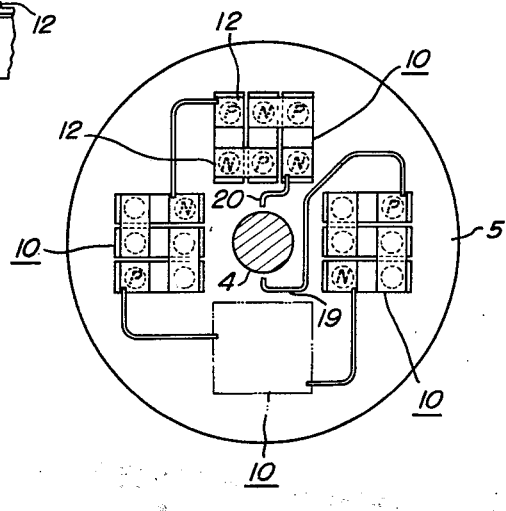
FIG. 3 shows somewhat diagrammatically the arrangement of thermoelectric cooling units on the end face of the ferrite rotor.

The thermo-electric cooling elements 10 may be arranged in any suitable manner on the end face of the ferrite rotor. FIG. 3 shows, by way of example, a manner of arranging four units 10 on the end face of rotor.

The direct electric current is supplied from a suitable source through a suitable controller C, stationary brushes 15, 16, slip rings 17, 18 mounted on the shaft 4, and conductors 19, 20, to the N and P semi-conductors in series. The controller C may comprise a rheostat and a change-over switch. When the machine is operated in extremely low temperature areas, the switch may be operated to reverse the direction of current flow so that heat is generated at the inner P-N junction planes for heating up the rotor 5 to compensate for any temperature drop thereof.

We claim:

A dynamo-electric machine comprising:

a stator, a substantially cylindrical rotor formed by ferrite type permanent magnet material disposed within said stator, a plurality of N-type and P-type semiconductor elements mounted on an end face of said rotor in heat conducting relationship therewith and electrically insulated therefrom, means connecting said semiconductor elements to form heat absorbing P-N junction planes adjacent said rotor face and heat generating P-N junction planes remote from said end face, means for passing direct current through said semiconductor elements, and heat-radiating wings associated with the heat-generating P-N junction planes remote from said end face.

References Cited in the file of this patent

UNITED STATES PATENTS

| | | |
|---|---|---|
| 2,959,018 | Hwang | Nov. 8, 1960 |
| 3,037,134 | Winter | May 29, 1962 |
| 3,097,027 | Mims | July 9, 1963 |

FOREIGN PATENTS

| | | |
|---|---|---|
| 620,083 | Germany | Oct. 14, 1935 |